INVENTORS: W. R. NORDQUIST
W. N. TOY
BY R. C. Winter
ATTORNEY

United States Patent Office

Re. 28,097
Reissued Aug. 6, 1974

28,097

TIME DIVISION SWITCHING SYSTEM EMPLOYING COMMON TRANSMISSION HIGHWAYS

Walter Reinhold Nordquist, Naperville, and Wing Noon Toy, Glen Ellyn, Ill., assignors to Bell Telephone Laboratories, Incorporated, Murray Hill, N.J.

Original No. 3,617,643, dated Nov. 2, 1971, Ser. No. 844,945, July 25, 1969. Application for reissue June 11, 1973, Ser. No. 369,094

Int. Cl. H04j *3/00*

U.S. Cl. 179—15 AQ 6 Claims

Matter enclosed in heavy brackets [ ] appears in the original patent but forms no part of this reissue specification; matter printed in italics indicates the additions made by reissue.

ABSTRACT OF THE DISCLOSURE

In a time division switching system, speech samples from a subscriber station are first encoded and then stored, in digital coded form in a register in a transceiver. The output of this register is gated to a second register in the common talking bus or highway during a first portion of a time slot; the sample from this register in the common highway is gated in a later portion of the same time slot to a similar transceiver connected to the called subscriber. It is then subsequently decoded and applied to the called subscriber. Two-wire, four-wire, and conferencing arrangements are disclosed.

BACKGROUND OF THE INVENTION

Telephone systems currently are available which operate on a time division basis in which a number of conversations share a single communication highway. Privacy of conversation is assured in such systems by the division or separation of individual conversations in time. Thus each conversation is assigned to the common highway for an extremely short, periodically recurring interval, and the connection between any two lines in communication is completed only in the assigned interval or time slot. Samples which retain essential characteristics of the voice or other signal are transmitted over the common highway in these time slots and are utilized in the called line to reconstruct the original signal.

One such telephone system, termed the electronic private branch exchange system, and designated PBX hereinafter, comprises a plurality of independent switch units, each located on a customer's premises and interconnecting the customer's distinct group of telephone lines in pairs via a time division switching network and a common transmission highway. All of the switch units are served in common by a remote control unit which, because of its electronic components, can tolerate many times the amount of traffic that a single switch unit can provide. switch unit in such a system is dictated instead by the nature of the internal time devisions switching operation.

The sampling frequency in a time division multiplex system must be at least twice the highest frequency of the signal to be transmitted. For voice, this requires a sampling rate of approximately 8 kilohertz, and typical PBX systems employ 24 time slots recurring at 125-microsecond intervals termed frames, the time slot duration being 5.2 microseconds. In switching these signal samples between telephone lines in communication, the energy transferred during operation of the time division switch must be approximately equal to the energy in the signal between successive samples in order to permit faithful reproduction of the original signal at the receiving terminal. As the time slot duration is made smaller, more power must be transmitted through the time division switch, and it is this situation which provides the ultimate limitation on the maximum number of time slots per frame. Such a limitation, of course, severely restricts the size of a switch unit on a customer's premises, and expansion beyond that limit may require additional switch units which in turn adds to the expense of the PBX facility.

SUMMARY OF THE INVENTION

In accordance with one illustrative embodiment of our invention, the problem encountered with respect to the capacity of a PBX switch unit on a customer's premises is solved by employment of a unique switching arrangement which permits a reduction in the duration of the time division switching operation itself, thus realizing a significant increase in the number of conversations which may time-share the common transmission highway. Signals from a subscriber station are sampled at a rate which is at least twice the highest frequency component. Thus, assuming the highest frequency in a speech signals is 4 kilohertz, sampling will be effected at an 8-kilohertz rate.

The speech samples then are coded and applied to a transceiver which may comprise a first register having sufficient capacity to accommodate all of the digits in the coded sample and being capable of bilateral transmission. The output of the transceiver is applied to another register on a common transmission highway via a bidirectional transmission gate which is enabled selectively during a brief portion of a time slot. The sample on the common highway is transferred through another bidirectional gate, in a later portion of the same time slot, to another transceiver connected to the called subscriber station. Subsequent to this time slot, the sample is decoded and applied to the called subscriber station. A similar path exists for transmission of signal samples from the called station to the calling station including a second common highway. Such an arrangement permits a reduction in the duration of a time slot to the extent that, with a sampling rate of 8 kilohertz, more than 1,000 time slots may be served within a repetitive 125-microsecond frame. This contrasts with the permissible 24 time slots in prior art systems at the same sampling rate.

In accordance with another illustrative embodiment of our invention, a similar operation is performed in a two-wire system as contrasted with the four-wire arrangement considered hereinbefore. The distinction rests in the fact that separate paths exist for incoming and outgoing signals in the four-wire system while the two-wire system contemplates that the same path will be shared by incoming and outgoing signals. Occasionally in telephone conversations both parties will be speaking simultaneously. In this event the signal transmitted over the common highway in the two-wire system will be a composite of the signals produced at both calling and called stations. The composite signal available on the two-wire path to each of the calling and called subscribers then is altered by a subtraction operation prior to decoding, such that only the desired signal is applied to each of the calling and called stations. The two-wire operation differs from the four-wire operation in the provision of this subtraction technique in each subscriber line plus the addition of the coded signal samples present on the two common highways. The resultant composite signal is returned to both calling and called lines via the corresponding highways by directional gates and transceivers.

The method of addition and subtraction depends upon the technique used in quantizing the input signal for encoding in binary form. For example, if the quantization is logarithmic, the addition and subtraction must be done logarithmically.

In accordance with one respect of the two-wire arrangement, conference connections may be completed in a similar fashion. Thus the composite signal received from all conferees may be accumulated during several time slots and then returned simultaneously to the conferees. Thus the resultant composite signal is simply the summation of all signals received in the common highways during the previous sequence of time slots. A distinct advantage derived from this arrangement is evident from the fact that any number of subscribers may be involved is a conference connection without loss or degradation of signals.

THE DRAWINGS

DETAILED DESCRIPTION

Figure 1:
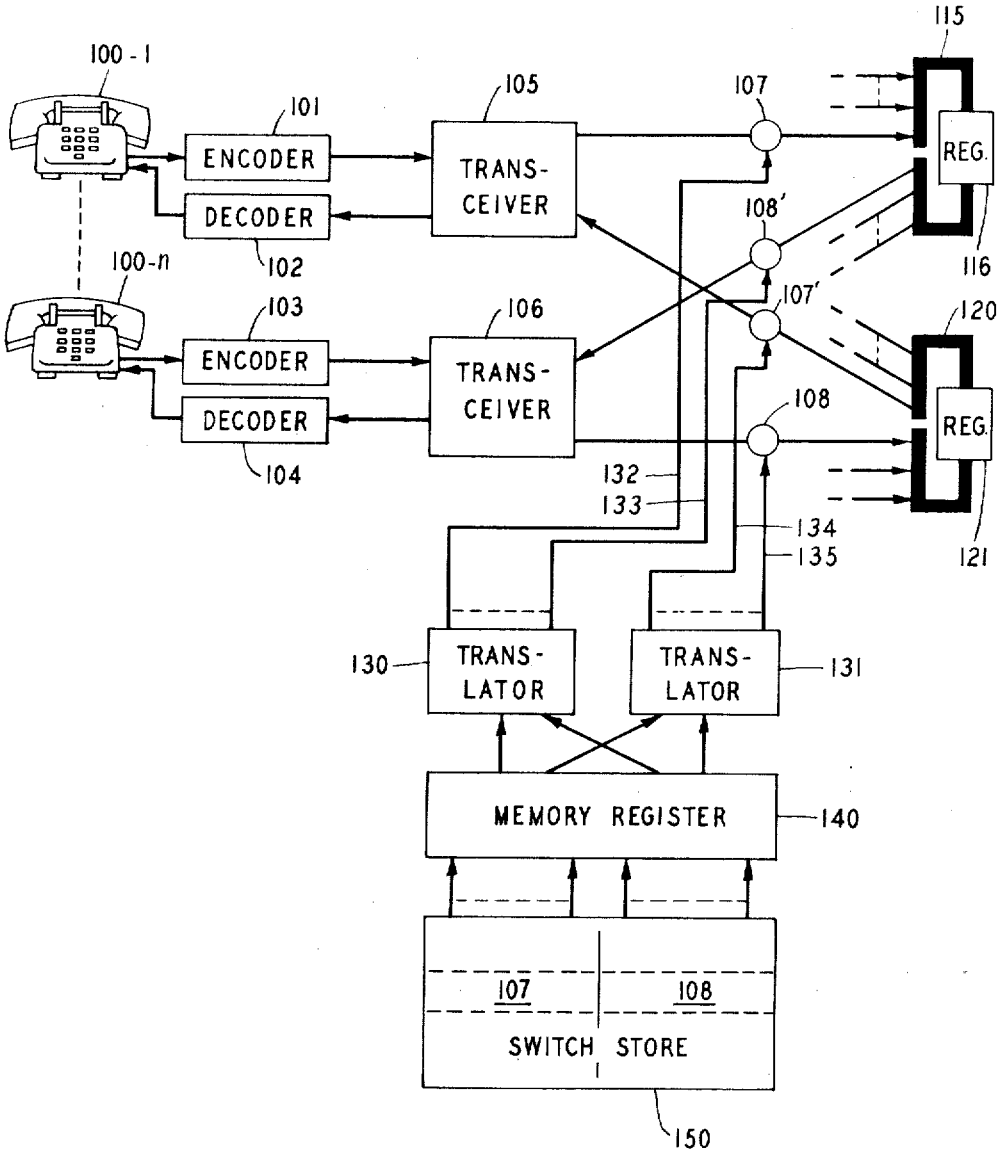
FIG. 1 is a block diagram of a communication system in accordance with one illustrative embodiment of the invention.

Turning now to the drawing, the time division telephone system depicted in FIG. 1 is similar to the system disclosed in R. C. Gebhardt et al. U.S. Pat. No. 3,225,144, issued Dec. 21, 1965, which will be described in general terms hereinafter to provide a basis for the detailed description of the improvements realized in accordance with this invention.

A PBX switch unit is illustrated which, in accordance with the Gebhardt et al. disclosure, provides the necessary switching and control facilities to accommodate a number of telephone stations 100–1 through 100–n. A remote control unit, not illustrated, processes all information provided by the illustrated switch unit in order to establish all desired call connections through the switch unit. The information necessary to the establishment of the actual time division switching connections is transferred from the remote control unit to the switch store 150 at the switch unit where it is included in a list of gate control messages which are cyclically scanned and applied individually in a regular sequence to memory register 140. Thereafter, during the time slot assigned to the particular conversation designated by the message in register 140, the message is translated into gate control signals by translators 130 and 131 to provide a sequence of gate control signals which enable transmission gates represented by gates 107, 107', 108 and 108'. Individual samples of the voice signal provided by the calling and called stations active in this particular conversation are thus transferred between the stations via common transmission highways 115 and 120.

For ease of illustration, only two of the stations 100–1 through 100–n are illustrated together with the necessary circuits to permit communication between them. The arrangement in the aforementioned Gebhardt et al. patent contemplates a maximum of 24 simultaneous conversations, each individual conversation being sampled simultaneously at the calling and called stations and the resultant signal sample being transferred between the respective participants via a common transmission highway during a preassigned one of 24 time slots in a recurrent cycle or frame. An 8-kilohertz time division sampling rate may be employed in this system in order to obtain a transmission quality equivalent to a 3.5 kilohertz nonmultiplexed arrangement. At this sampling rate, each of 24 speech sample periods or time slots has a duration of 5.2 microseconds. Such a duration is required to assure proper transfer of the speech samples through the time division switching network and faithful reproduction of the original signal at the receiving terminal.

In accordance with this embodiment of our invention, the number of available time slots may be increased by an order of magnitude, and this operation will be described hereinafter. The facilities required in the transmission path include encoders 101 and 103, which convert the original voice sinal to a pulse code modulated (PCM) form. Typically, the number of bits required to enode voice signal into PCM form varies between four and eight depending upon the quality desired. In the following description it is assumed that m bits are utilized. In order to transfer m bits simultaneously from transceivers 105 and 106 to registers 116 and 121, control gates 107, 107', 108 and 108' and highways 115 and 120 also each accommodate m bits. Similarly, on the receiving end, decoders 102 and 104 restore the coded voice signals to analog form prior to receipt by the corresponding stations 101–1 and 100–n. Such encoders and decoders for conversion between analog and PCM may take any one of a number of forms available in the art. Transceivers 105 and 106 comprise simple shift registers having a number of register stages corresponding to the number of digits in each coded speech sample. Again such as register is well known in the art.

Transmission gates 107, 107', 108 and 108' are of a form for rapid transfer of digital information between transceivers 105, 106 and the common transmission highways 115, 120. Advantageously, these gates should be capable of transmitting digital information in either direction as will be evident in considering the various arrangements depicted in FIGS. 5–9. Such a bidirectional gate is known in the art as disclosed, for example, in W. R. Nordquist et al. patent application, Ser. No. 787,-185, filed Dec. 26, 1968, *now Pat. No. 3,618,033*. Transmission highways 115 and 120 are m bit lines which each receive a signal sample in a first portion of a time slot and apply the signal samples to the respective registers 116 and 121, which again are of conventional form.

The prior art switching arrangement as described in the aforementioned Gebhardt et al. patent utilizes a single common transmission highway which receives a signal sample from a calling station during one time slot and transmits that sample to the called station during the same time slot. In this instance, therefore, a pair of m bit transmission gates, each corresponding to one of the calling and called stations, operates simultaneously to effect the desired signal transfer between the two stations. As noted in FIG. 1, the arrangement in accordance with this embodiment of our invention stores each signal sample transferred to one of the two highways 115 and 120 during a first portion of a time slot and directs these stored samples to the appropriate receiving stations in a later portion of the same time slot.

This distinction may be understood by considering the operations involved in transferring samples between two stations in communication, viz, stations 100–1 and 100-n. It is assumed that the remote control unit has honored the request for service received from one of these two stations and has provided the necessary information to switch store 150 for the establishment of a connection between these two stations during a preassigned time slot. Thus as illustrated in FIG. 1, switch store 150 contains the designations of the appropriate gates which must operate during the preassigned time slot to effect a signal transfer from these two stations.

Consider, for example, that a signal sample emanates from stations 100–1 and 100–n simultaneously. These samples are converted from analog to PCM form in the respective encoders 101 and 103 and subsequently are applied to transceivers 105 and 106. At the next appearance of the assigned time slot, the information designated in switch store 150 will be applied to memory register 140, converted to a gate control pulse in translators 130 and 131 and applied to gates 107 via lead 132 and to gates 108 via lead 135 so as to operate these gates simultaneously. With gates 107 and 108 enabled, the coded signal samples are transferred from transceivers 105 and 106 to common highways 115 and 120 respectively for registration in the corresponding registers 116 and 121. After a brief delay and still within the preassigned time slot interval, translators 130 and 131 provide control signals simultaneously on leads 133 and 134, serving to enable the respective gates 108' and 107'. This operation results in the transfer of signal samples from registers 116 and 121 to transceivers 106 and 105, respectively. Thereafter the signal samples are converted to analog form in decoders 102 and 104 and applied to the respective stations 100–1 and 100–n.

It should be noted that the paths traveled through the switching network by the respective signal samples are unilateral. However, the transceivers are each employed only for a brief portion of the entire frame by the corresponding station. Therefore, each transceiver may be time shared by a number of stations on a time multiplex basis. This, of course, reduces drastically the number of transceivers and transmission gates required in this arrangement. With unilateral transmission it is evident that two paths through the network are involved in each active conversation, one path for transmitting or talking and another path for receiving or listening. Prior to the sampling period, the encoded samples provided by station 100–1 and 100–n are stored in their respective transceivers 105 and 106. During the sampling period, i.e., the preassigned time slot, the contents of the transceivers are interchanged by means of the transmission gates and common highways, the latter being shared by all of the stations terminating on the switch unit. As indicated, the contents of the transceivers are applied to the decoders after the sampling period has terminated.

Figure 2:
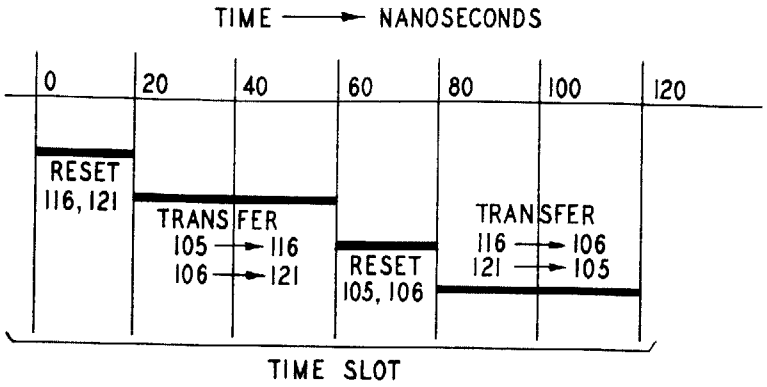
FIG. 2 is a time chart illustrating the operations occurring during a single time slot in the system depicted in FIG. 1.

As noted in FIG. 2, the preassigned time slot is divided into four operating intervals of 20, 40, 20 and 40 nanoseconds, respectively, for a total of 120-nanosecond time slot. The sequence of operations occurring during the time slot is noted in FIG. 2. Thus, in the first 20 nanoseconds, registers 116 and 121 on the common highways are cleared or reset to zero preparatory to the receipt of the next coded signal sample. Thereafter, in a 40-nanosecond interval, the signal sample available in transceiver 105 is transferred to register 116 via transmission gate 107 and common highway 115. Similarly, during this 40-nanosecond interval the signal sample in transceiver 106 is transferred to register 121 via transmission gate 108 and common highway 120. In the following 20-nanosecond interval transceivers 105 and 106 are cleared or reset to zero preparatory to the return of the signal samples in the final 40-nanosecond interval of the time slot. In this instance, the signal sample in register 116 is transferred to transceiver 106 via highway 115 and gate 108' while the sample in register 121 is transferred to transceiver 105 via highway 120 and gate 107'.

During the next time slot the same operation is repeated for a different pair of subscribers, their identities, or rather the identities of the gates to be enabled for their interconnection, being stored in the next sequential position in switch store 150. Thus switch store 150 cycles through all of the control words corresponding to time slots in sequence. If the sampling rate is 8 kilohertz, a scan through switch store 150 will be completed in 125 microseconds. Since each time slot requires only 120 nanoseconds, more than 1,000 time slots can be accommodated within the 125-microsecond frame interval. This then contrasts with the 3.2-microsecond time slot in the aforementioned Gebhardt et al. arrangement which can accommodate a mere 24 time slots in the same frame interval.

Figure 3:
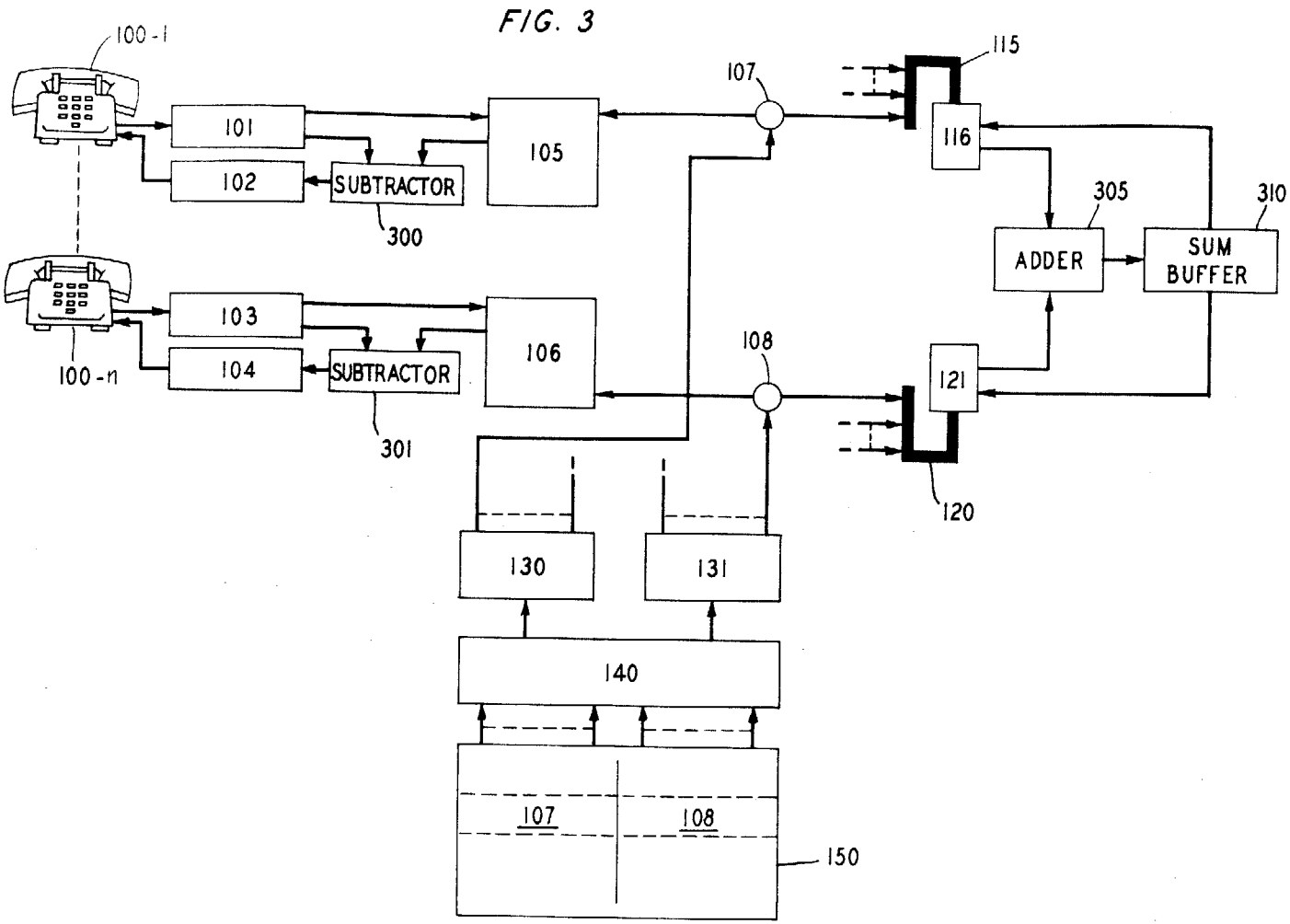
FIG. 3 is a block diagram of a communication system in accordance with another illustrative embodiment of the invention.

The arrangement described in regard to FIG. 1 may be termed a four-wire system with all transmission unilateral. An alternative arrangement which proves advantageous for conference connections, as described hereinafter, may be termed a two-wire system in which signal samples are transmitted in both directions through the same transmission path. Such an arrangement is depicted in FIG. 3. The apparatus and interconnecting facilities are essentially the same as those depicted in FIG. 1 with the addition of a subtraction circuit in each line, such as subtractors 300 and 301 associated with the respective stations 100–1 and 100–n. This circuit performs a subtraction operation between the coded outgoing signal sample and the composite of the incoming and outgoing signal samples received through the switching network. The resultant of the subtraction is the desired incoming coded signal sample. Also included in this arrangement is adder circuit 305 which, as its name implies, serves to add the coded signal sample from each station engaged in a conversation. The resultant sum is applied to sum buffer 310. All of these circuits are straightforward and easily implemented with arrangements available in the art.

Figure 4:
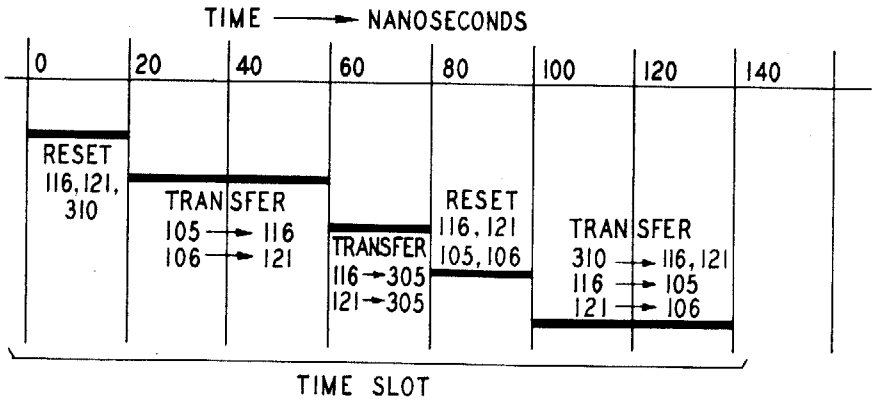
FIG. 4 is a time chart illustrating the operations occurring during a single time slot in the system depicted in FIG. 3.

The manner of operation of the arrangement depicted in FIG. 3 is indicated in the time chart, FIG. 4. The time slot in this instance is divided into five distinct intervals of, respectively, 20, 40, 20, 20 and 40 nanoseconds for a total time slot interval of 140 nanoseconds. The sequence of operations may be traced through the network of FIG. 3. considering again the example of a conversation in progress between stations 100–1 and 100–n.

In the first 20-nanosecond interval, highway registers 116 and 121 and sum buffer 310 are cleared by resetting them to zero. The encoded signals stored in transceivers 105 and 106, representing signal samples from the respective stations 100–1 and 100–n, are thereafter gated to the respective highway registers 116 and 121 via bidirectional gates 107 and 108. This action occurs during the second distinct interval in the time slot which has a duration of 40 nanoseconds, FIG. 4. In the following 20-nanosecond interval, the signal samples currently stored in registers 116 and 121 are applied simultaneously to adder 305 from which the resultant sum is immediately transferred to sum buffer 310 for short-term storage. Registers 116, 121 and transceivers 105, 106 are reset during the next 20-nanosecond interval. Then in the final 40 nanoseconds, the composite signal sample is transferred from sum buffer 310 to both transceivers 105 and 106 via the same transmission paths occupied during the initial transfer from the transceivers to the highway registers.

Subsequent to the assigned time slot, the composite signal is applied to subtractors 300 and 301 such that the signal sample derived from station 100–1 is converted to analog form in decoder 104 and applied to station 100–n. Similarly, the signal sample derived from station 100–n is converted to analog form in decoder 102 for application to station 100–1.

Figure 5:
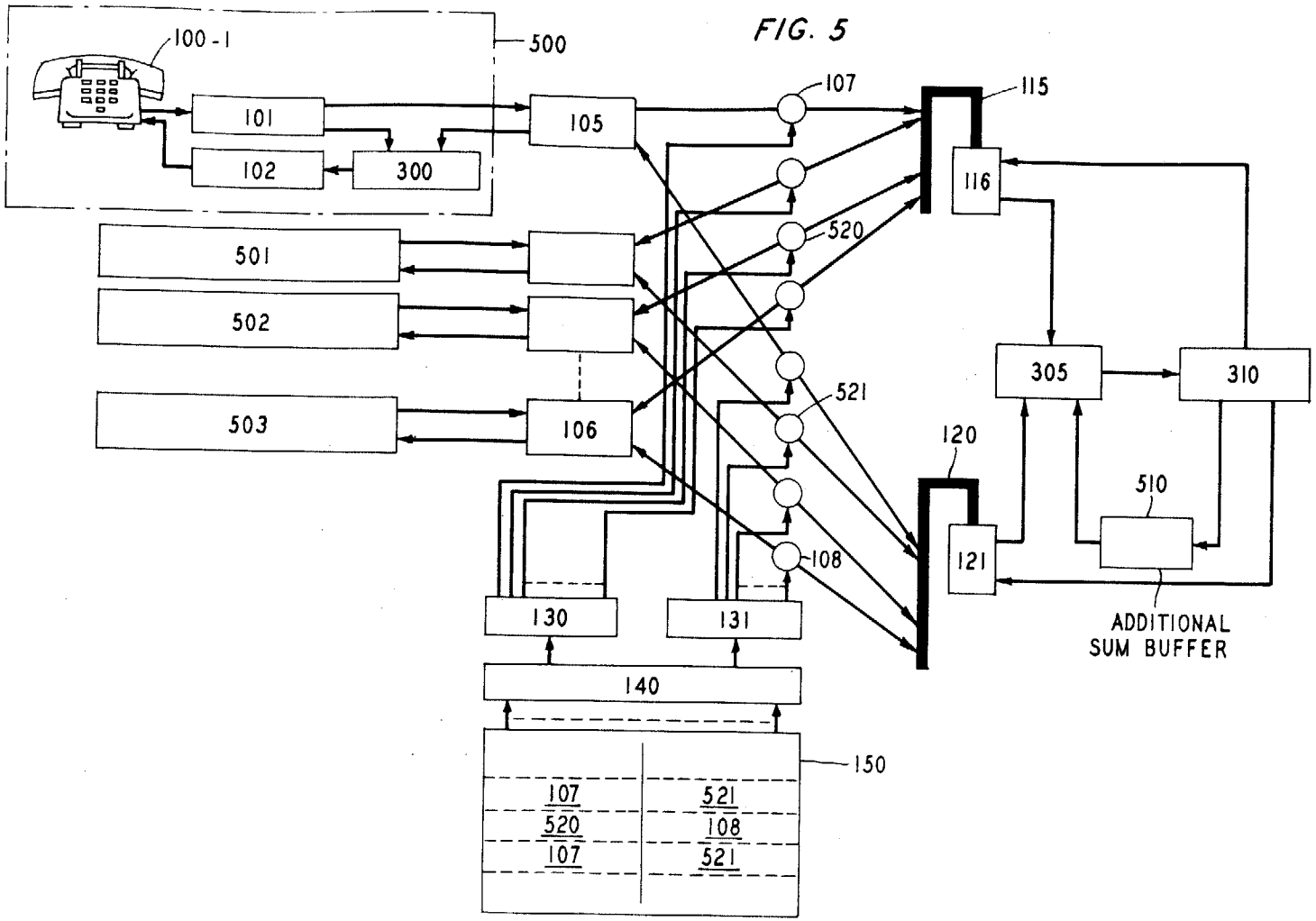
FIGS. 5–9 are block diagrams of systems of the type depicted in FIG. 3 modified to accommodate conference connections and various other operations.

This sequence of operations requires 20 nonaseconds more than utilized in the arrangement according to FIG. 1. At the sampling rate of 8 kilohertz, the number of time slots which can be accommodated by switch store 150 is reduced to 893. However, the arrangement according to FIG. 3 is particularly adaptable to multiparty conference connections. Thus, for example, as noted in FIG. 5, four telephone lines 500–503 are interconnected for a conference. Such an arrangement, of course, requires that each conferee receive the signal samples provided by all of the other conferees. For this purpose additional sum buffer 510 is connected to receive the cumulative signal sum stored in buffer 31. In general, with n conferees, n–1 time slots are required if n is even, and n time slots are required if n, is odd. Thus with the four conferees 500–503, three time slots are required. For example, as noted in the message sequence in switch store 150, samples are transferred from lines 500 and 501 via gates 107 and 521, respectively, in a first time slot and from lines 502 and 503 via gates 520 and 108, respectively, in a second time slot. The samples from lines 500 and 501 are added together in adder 305 and their sum stored in additional sum buffer 510 via buffer 310 during the first time slot assigned to this conference. During the second conference time slot the contents of buffer 510 is added to the samples received from lines 502 and 503 in adder 305 and the resultant stored in buffer 310. Also, during the second conference time slot, this resultant composite signal is transferred from buffer 310 to conference lines 502 and 503 via the same bilateral gates 520 and 108 from which the signal samples previously were received from the corresponding conference lines. In order to apply this resultant composite signal to lines 500 and 501 as well, an additional conference time slot is employed, as illustrated in FIG. 5. In this instance the composite signal is retained in buffer 310 for transfer to lines 500 and 501 during the third conference time slot via bidirectional gates 107 and 521. All conference time slots appear in sequence during the repetitive cycle of time slots.

Figure 6:
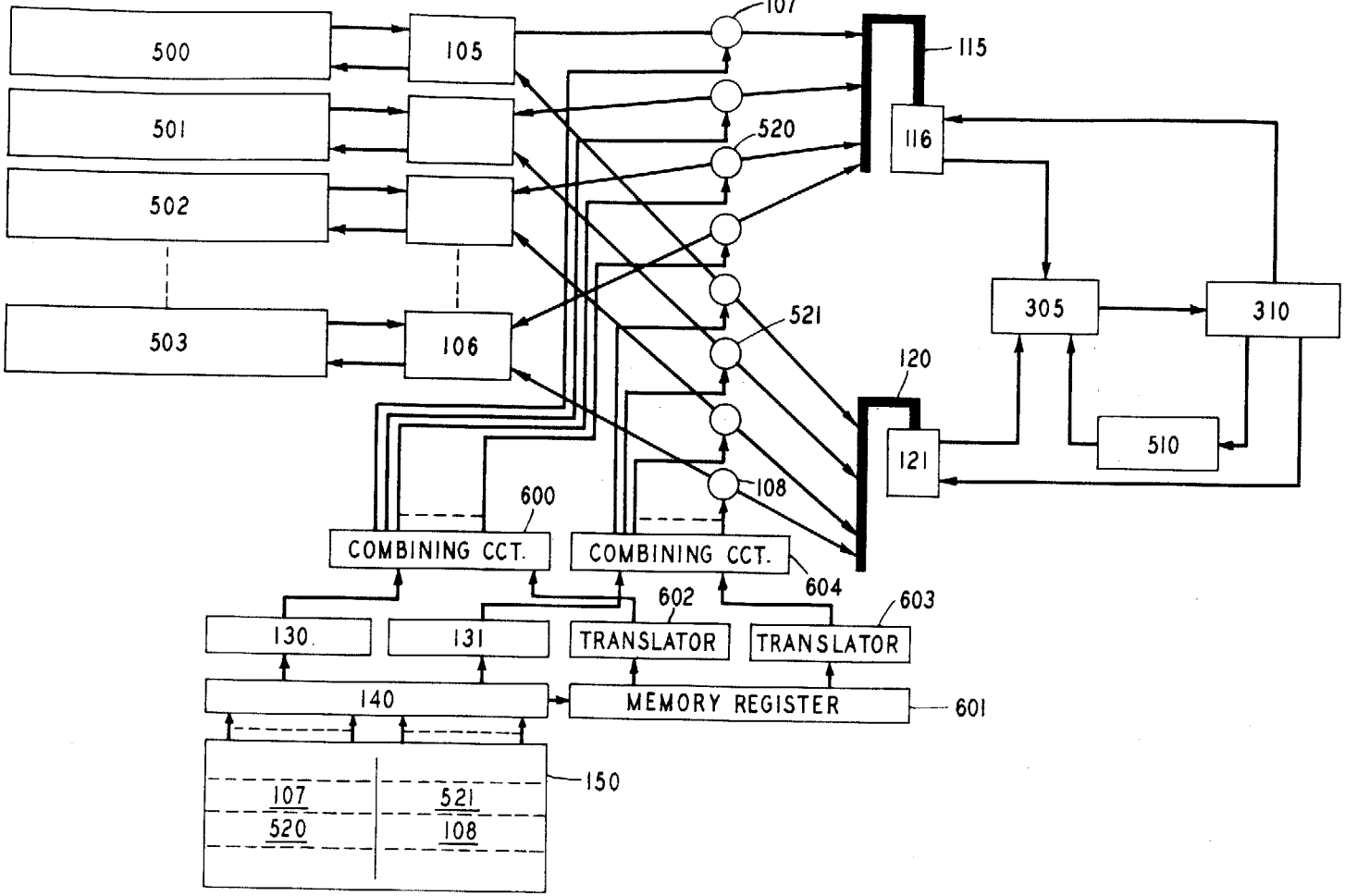

An alternative arrangement for multiparty conferences is illustrated in FIG. 6. In this instance an additional memory register 601 and translators 602 and 603 are included. The bidirectional gate control signals in memory 150 are applied to translators 130 and 131 during the first conference time slot in order to transfer signals from lines 500 and 501 and simultaneously, these gate control signals are stored in register 601. During the second conference time slot, therefore, the resultant composite signal may be gated simultaneously to all conference lines 500–503 by applying the contents of registers 140 and 601 simultaneously to appropriate ones of the bidirectional gates. Combining circuits 600 and 604 assure that the composite signal will be transmitted to each of the conference lines as required. This alternative, of course, requires additional circuitry but has the advantage of conserving available time slots where speed is of the essence.

Underlining the conference arrangements considered in this illustrative embodiment of our invention is the transfer of signal samples in digital form rather than in the analog form as employed in the prior art. The virtue of digital transfer is the preservation of the same signal level throughout the transfer operation for all conferees. In the prior art arrangement, the energy in the analog signal is divided among all conferees. Thus, if one conferee is speaking to two others, the energy of his voice, at best, is divided equally between the two recipients, assuming, of course, that the line circuits of all conferees are perfectly terminated. Each additional conferee will reduce the signal level accordingly. In such an arrangement it is impractical to permit more than four conferees in a single conference without inserting additional gain. In accordance with this illustrative embodiment of our invention, with the signal in digital form, any number of conferees may be included in the conference connection without signal loss or degradation.

Figure 7:
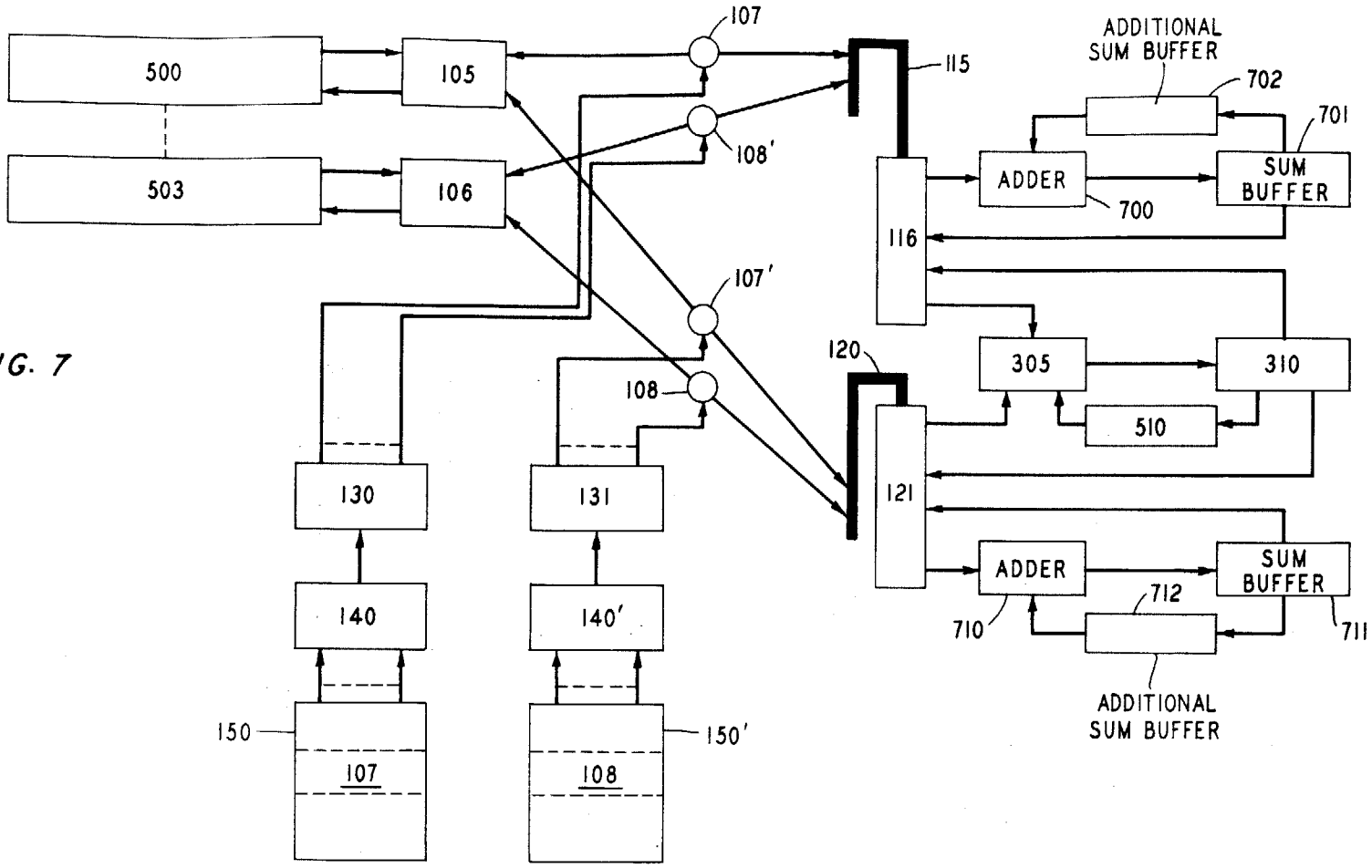
Figure 8:
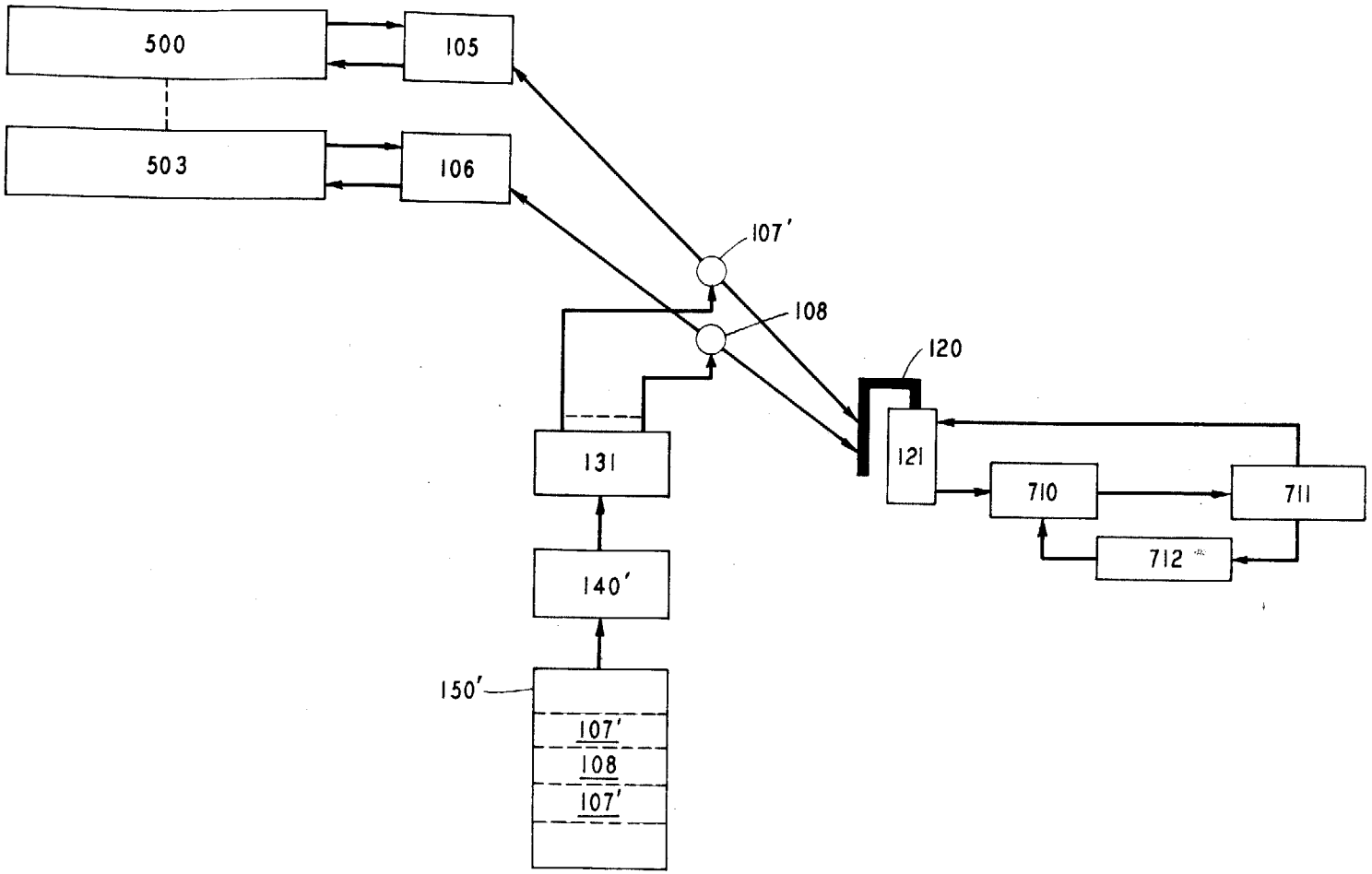
Figure 9:
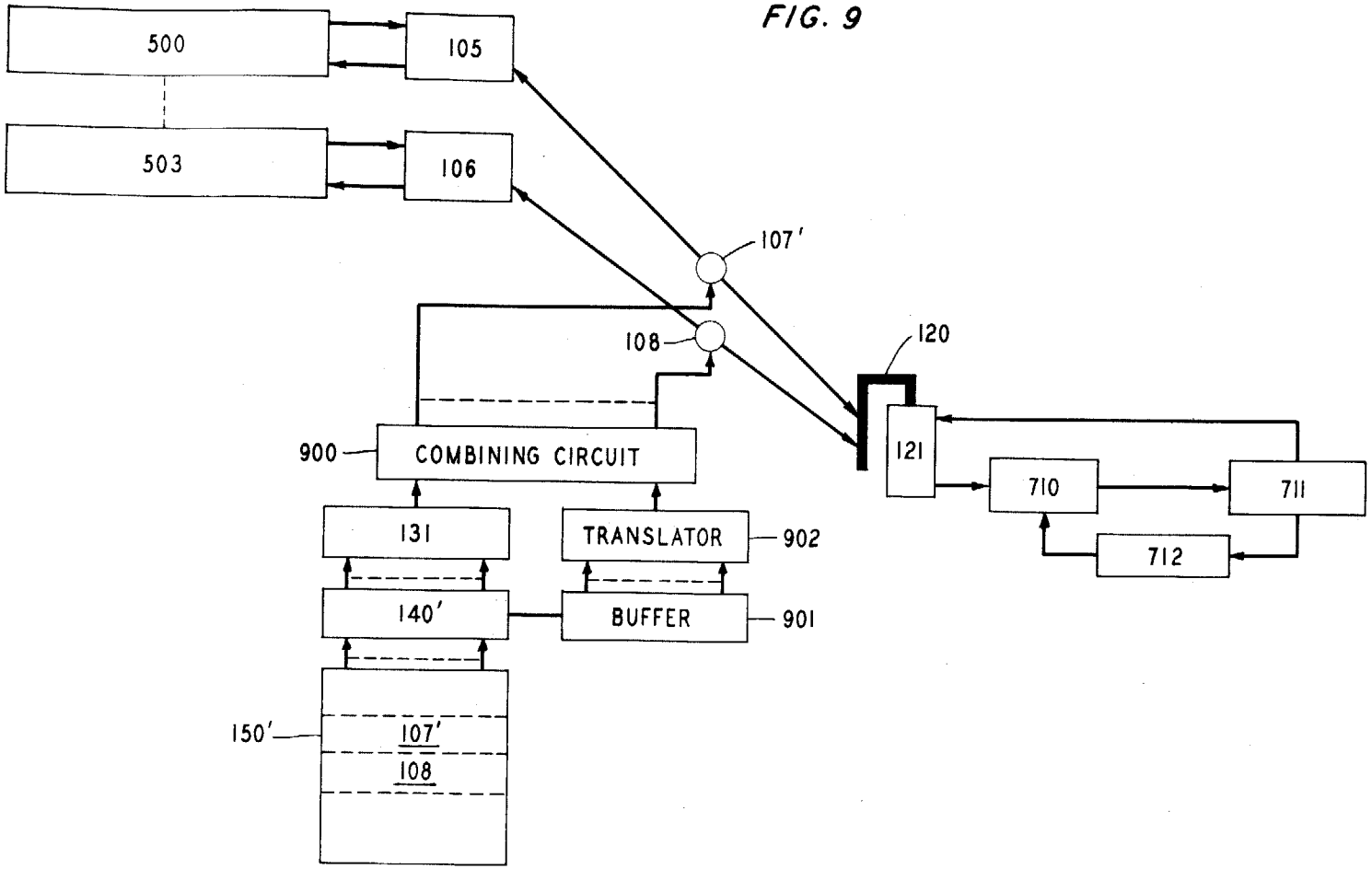

As noted in FIGS. 7–9, redundancy in the adder and buffer circuitry together with a partition of the switch store translation circuitry can assure continuous service at reduced capacity upon the occurrence of any single fault and certain multiple faults. Thus in FIG. 7, each of the two highways 115 and 120 is provided with its own adder and buffer circuitry, viz, adder 700, sum buffer 701 and additional sum buffer 702 for highway 115 and adder 710, sum buffer 711 and additional sum buffer 712 for highway 120. The switch store, in turn, is divided into two equal sections 150 and 150′ with separate access to each section, thus forming two independent stores of the same word length. The two stores are run in synchronism with translator 130 associated with section 150 and translator 131 associated with section 150′. If a failure occurs in one of the highways 115 or 120 or in one of the adders 305, 700 or 710, the other highway and the associated section of the switch store is available to continue the operation of the system on its own. For example, if highway 115, adder 305 and switch store section 150 all exhibit failures simultaneously, the system may be continued in service utilizing highway 120, adder 710 and switch store section 150′.

Alternative arrangements for maintaining this "in-service" condition are shown in FIGS. 8 and 9. Thus as noted in FIG. 8, three time slots are assigned to each conversation which, of course, means that the system capacity is reduced to one-third of its normal capacity. In this instance a sample from subscriber line 500 is stored in additional sum buffer 712 during the first time slot, and in the second time slot a sample from line 503 is added to the sample in buffer 712 and the resultant sum returned to line 503. Finally, in the third time slot assigned to this conversation, the resultant sum contained in buffer 711 is returned to line 500.

The alternative method, as illustrated in FIG. 9, provides a memory buffer 901 and additional translator 902 which permits continued service on a two-time slot per conversation basis. Again a sample from line 500 is stored in additional sum buffer 712 during the first time slot, and at the same time the information for enabling bidirectional gate 109 is transferred to memory buffer 901. In the second time slot, therefore, the signal from line 503 is added to the contents of buffer 712 and the resultant sum applied to both lines 500 and 503 simultaneously via gates 107′ and 108.

What is claimed is:

1. A time division switching system comprising a plurality of lines, first and second common transmission highways and means for interconnecting calling and called ones of said lines via said highways during an assigned time slot in a repetitive cycle of time slots, said interconnecting means comprising means for simultaneously transferring a signal sample from each of said calling and called lines to said first and second highways respectively, means for adding said calling line sample to said called line sample, means for transferring the resultant signal summation to said calling and called lines, means for subtracting the signal sample developed in each of said calling and called lines from said resultant signal summation and means for applying the resultant difference signals to the respective calling and called lines.

[2. A time division communication system comprising a plurality of lines, a plurality of common highways accessible from said plurality of lines, means for transferring a signal sample from each of said plurality of lines to a corresponding preselected one of said plurality of highways during a first portion of a time slot in a repetitive cycle of time slots and means operative in a second portion of the same time slot for transferring said signal samples from said plurality of highways to corresponding, predetermined ones of said plurality of lines.]

[3. A time division communication system in accordance with claim 2 wherein each of said highways comprises register means, said signal samples from said plurality of lines being interchanged via said register means during said same time slot.]

4. A time division communication system in accordance with claim [2] *1* wherein each of said plurality of lines comprises means for [coding] *digitally encoding* and decoding said signal samples and further comprising means for registering said coded signal samples prior to transmission to said highways via said transferring means.

5. A time division communication system in accordance with claim [2] *1* wherein each of said highways comprises register means, and further comprising means interconnecting said highway register means for combining said signal samples and buffer storage means for applying the resultant combined signal sample from said combining means to each of said plurality of lines via said register means in each of said highways. [, and wherein each of said lines comprises means for subtracting the signal sample produced by the corresponding line from said resultant combined signal sample.]

6. A time division communication system in accordance with claim 5 and further comprising means for storing the content of said buffer storage means and means for applying the content of said storing means to said combining means during a succeeding time slot.

[7. A communication system comprising a plurality of stations, common highway means, means for coding signal samples from the associated stations, means for storing said signal samples, switching means, and means for enabling said switching means during distinct successive time intervals in a repetitive cycle to transfer said signal samples to and from said highway means, said coding means being connected between said storing means and each of said stations, said switching means being connected between said storing means and said highway means, and said highway means comprising register means for storing said coded signal samples intermediate transfers to and from said highway means.]

8. A communication system [in accordance with claim 7 wherein said highway means comprises] *comprising a plurality of stations, common highway means, including* a pair of common highways, *means for digitally encoding signal samples from the associated stations, means for storing said digitally encoded signal samples, switching means, and means for enabling said switching means during distinct successive time intervals in a repetitive cycle to transfer said signal samples to and from said highway means, said encoding means being connected between said storing means and each of said stations, said switching means being connected between said storing means and said highway means, said highway means comprising register means for storing said digitally encoded signal samples intermediate transfers to and from said highway means,* and further comprising means interconnecting said highway register means for adding together said stored samples, and means for applying the resultant sum to said highways.

*9. A time division conferencing communication system comprising a plurality of lines, a plurality of highways accessible through switching means from each of said lines, each highway including a register, means for defining a plurality of time slots in a repetitive cycle of time slots for signal samples transmitted between said lines over said highways, means for transferring signal samples from a group of said lines among which a conferencing connection is to be established to predetermined ones of said highway registers during a first portion of a time slot, and means for transferring signal samples from said ones of said highway registers to said group of said lines in a second portion of the same time slot.*

References Cited

The following references, cited by the Examiner, are of record in the patented file of this patent or the original patent.

UNITED STATES PATENTS

| | | | |
|---|---|---|---|
| 3,508,007 | 4/1970 | Goodall et al. | 179—15 A |
| 3,449,520 | 6/1969 | Hoschler et al. | 179—15 BF |
| 3,225,144 | 12/1965 | Gebhardt et al. | 179—27 CA |

THOMAS W. BROWN, Primary Examiner

U.S. Cl. X.R.

179—18 BC